Oct. 27, 1964   A. E. LÖVGREN   3,154,297
BEATER
Filed Oct. 15, 1962
FIG. 1
FIG. 2
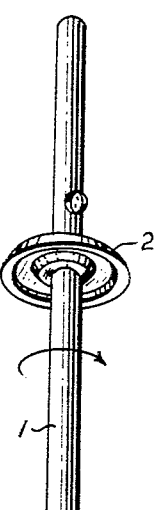
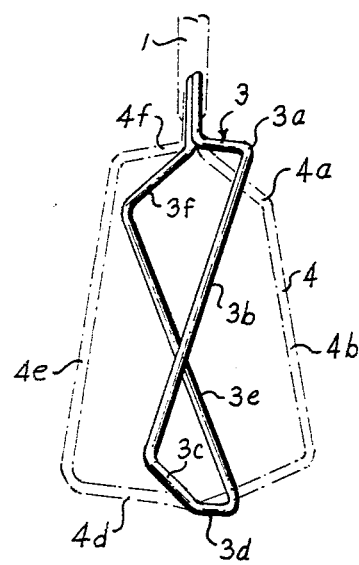
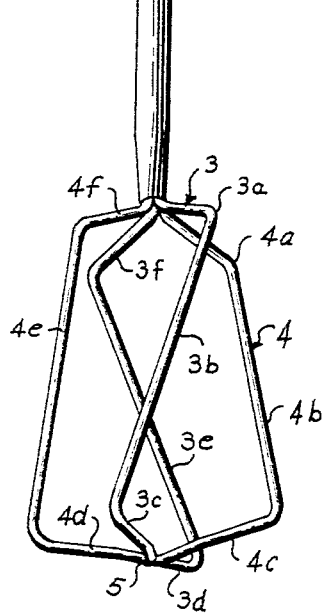
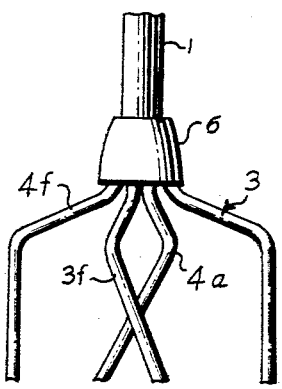
FIG. 3
INVENTOR
Anders Erik Lovgren
BY
Michael J. Striker
ATTORNEY

United States Patent Office 3,154,297
Patented Oct. 27, 1964

3,154,297
BEATER
Anders Erik Lövgren, Sollentuna, Sweden, assignor to Robert Krups, Solingen-Wald, Germany, a firm
Filed Oct. 15, 1962, Ser. No. 230,542
6 Claims. (Cl. 259—134)

In everyday life there are found many embodiments of beaters, especially such as are used in electrical household appliances. For instance, beaters are known that comprise a bar which is rotatable by means of a driving arrangement and the forward end of which is provided with several overlapping bows consisting of band-like material. But such beaters have still disadvantages, as has been proved in practice, for the band-like bows cut too heavily through the material to be processed during rotation of the beater bar. On the one hand, therefore, a stagnant volume of the material remains enclosed during the rotation in the space bound by the bows, while on the other hand the material outside of this space is blocked. Hence, the circulation necessary for effective whirling of the entire mass to be processed must necessarily be insufficient.

However, there are also beaters known which consist of several bows of wire-like material and which also are carried by a rotatable bar, the bows of which are arranged flush. The whirling effect of these bows shows certainly some improvement, yet these beaters leave many wishes to be desired. Especially there is no upward movement of the material to be processed.

It is the object of the present invention to further improve the beaters of the above-stated kind and to remove their disadvantages.

The invention provides a beater comprising an elongated bar, a coupling provided at one end of the bar and adapted to be inserted into a driving arrangement, at least two intersecting wire bows provided at the other end of the bar, said bows having opposite parts, being in substantially upright positions in the operating position of the beater, continuously inclined in respect of the longitudinal axis of said beater.

The inclined parts of each wire bow which at first has a substantially rectangular form is preferably twisted out of the plane of the rectangle in opposite directions.

Owing to the design of the beater proposed by the invention the material to be processed is subjected to strokes during the whirling action. In addition, a relatively slight but heavy air-pressing-in impact effect is achieved; the circulation being effected by the tool of the beater so that air is effectively pressed into the entire mass during the whirling process. The beater has given highly satisfactory results in the tests carried out so far and will give in shorter time a heavier foam, and whirling effect in comparison with known beaters, provided they are driven with the same speed and have the same dimensions.

Each rectangle preferably consists of two symmetrical halves located in different planes which include an angle between them.

A preferred embodiment of the invention will now be described by way of example and with reference to the accompanying drawing, in which:

FIG. 1 is an elevational view of a beater according to the invention,

FIG. 2 is a partial view of the beater shown in FIG. 1, and

FIG. 3 is a partial view of a modified beater.

FIG. 1 shows a beater having an elongated supporting bar 1 the rear end of which is provided with a coupling adapted to be inserted into a driving arrangement. It is immaterial whether or not this driving arrangement is hand- or motor-operated. The beater can, however, be especially used with electric kitchen machines, especially with such as are held in one's hand during operation. These appliances are generally equipped with two sets of blades rotating in opposite directions.

The bar 1 is provided with a guard ring 2 at its rear end and with a mixing or whirling member at its forward end. This whirling member consists of two substantially rectangular bows 3 and 4 which intersect each other and consist of wire. The bows are mounted at the forward end of the bar 1 by having the free ends of the wire inserted in a tube- or sleeve-like part of the bar 1. However, mounting may also be by means of a hub or a bushing 6 which in turn is fastened to the bar 1 as seen in FIG. 3. The forward parts of the two bows or loops, 3 and 4 are connected to each other at 5.

FIGS. 1 and 2 show the shape of the bows 3 and 4. The bows may be manufactured as follows: A metal wire of for instance 2 mm. thickness is first bent into plane rectangles, i.e. the rectangles $3a$, $3b$, $3c$, $3d$, $3e$, $3f$, and $4a$, $4b$, $4c$, $4d$, $4e$ and $4f$. Thereupon two opposite sides which constitute mixing elements $3b$, $3e$, and $4b$, $4e$ are bent out of the original plane of the rectangle in opposite directions so that one half of said rectangle is in a plane inclined to the plane of the other half. The two halves are substantially symmetrical. Owing to the bending effect the sides $3b$, $3e$, and $4b$, $4e$ have a definite angle with respect to the longitudinal axis of the bar 1, i.e. these sides are angularly inclined to the longitudinal axis of the bar 1. Thus, a beater is produced which imparts a stroke effect to the material to be processed during the operation. At the same time a slight, but heavy air-pressing-in impact action is effected.

As stated above this embodiment is only a realization of the invention by way of example and not limited thereto. Many other embodiments and applications are possible. For instance, instead of two, also three or more bows may be used.

I claim:

1. A beater comprising an elongated supporting member arranged to be mounted for rotational movement about the axis thereof; and a mixing member provided at one end of said supporting member and including a pair of similar portions disposed at the opposite sides of said axis and each comprising an elongated substantially straight mixing element and a leg connected with one end of the respective mixing element and with said one end of said supporting member, said mixing elements crossing each other in space and being inclined with reference to the axis of said supporting member.

2. A beater comprising an elongated supporting member arranged to be mounted for rotational movement about the axis thereof; and a mixing member provided at one end of said supporting member and including a pair of U-shaped portions disposed at the opposite sides of said axis and each comprising an elongated substantially straight mixing element, a first leg connected with one end of the respective mixing element and with said one end of said supporting member and a second leg connected with the other end of the respective mixing element and with the second leg of the other U-shaped portion, so that said U-shaped portions form a substantially trapezoidally shaped loop, said mixing elements crossing each other in space and being inclined with reference to the axis of said supporting member.

3. A beater as set forth in claim 2 wherein said mixing elements are inclined toward said axis in a direction from said second legs toward said first legs.

4. A beater comprising an elongated supporting member arranged to be mounted for rotational movement about the axis thereof; and a mixing member provided at one end of said supporting member and including a plurality of U-shaped portions disposed about said axis and each comprising an elongated substantially straight mixing element, a first leg connected with one end of the respective mixing element and with said one end of said supporting member, and a second leg connected with the other end of the respective mixing element and with the second leg of each other U-shaped portion so that said U-shaped portions form a plurality of substantially rectangularly shaped loops the respective leg portions of which intersect along an extension of said axis, said mixing elements crossing each other in space and being inclined with reference to the axis of said supporting member.

5. A beater as set forth in claim 4, wherein said first legs are connected to said supporting member by means of a bushing provided thereon.

6. A beater as set forth in claim 4, wherein each of said substantially rectangularly shaped loops is disposed in space in two oblique planes intersecting along a diagonal of said loop.

References Cited in the file of this patent

UNITED STATES PATENTS

| | | |
|---|---|---|
| 944,781 | Gienandt | Dec. 28, 1909 |
| 1,401,475 | Jensen | Dec. 27, 1921 |

FOREIGN PATENTS

| | | |
|---|---|---|
| 173,476 | Switzerland | Feb. 16, 1935 |
| 958,554 | France | Sept. 12, 1949 |